(12) United States Patent
Lai

(10) Patent No.: US 8,125,731 B2
(45) Date of Patent: Feb. 28, 2012

(54) ENCODER MODULE WITH A SLIDING ASSEMBLY

(75) Inventor: Yun-Long Lai, Taipei Hsien (TW)

(73) Assignee: Honest Sensor Corp., Taipei County (TW)

( * ) Notice: Subject to any disclaimer, the term of this patent is extended or adjusted under 35 U.S.C. 154(b) by 572 days.

(21) Appl. No.: 12/346,828

(22) Filed: Dec. 30, 2008

(65) Prior Publication Data
US 2010/0165507 A1    Jul. 1, 2010

(51) Int. Cl.
*G11B 17/00*    (2006.01)
(52) U.S. Cl. ............... 360/97.01; 360/133; 360/77.07
(58) Field of Classification Search .......... 360/97.01, 360/133, 77.07
See application file for complete search history.

(56) References Cited

U.S. PATENT DOCUMENTS

| | | | |
|---|---|---|---|
| 5,859,425 A * | 1/1999 | Mleinek et al. | 250/231.13 |
| 6,462,442 B1 * | 10/2002 | Braun et al. | 310/68 B |
| 7,394,219 B2 * | 7/2008 | Tenca et al. | 318/640 |

* cited by examiner

*Primary Examiner* — Connie Yoha
(74) *Attorney, Agent, or Firm* — Leong C. Lei

(57) ABSTRACT

An encoder module with a sliding assembly comprises a cover, a disk, a reading head, a bottom plate, and a sliding unit; wherein in assembly, the disk is installed at an upper front side of the bottom plate; the reading head is installed upon a front side of the sliding unit; the sliding unit is pushed into a lower hole of the bottom plate so that a front end of the sliding unit exposes from the lower hole of the bottom plate; in that the reading head serves to read signals from the disk; finally the cover covers upon an outer side of the bottom plate, the sliding unit and the reading head so as to form as an encoder module with a sliding assembly.

1 Claim, 8 Drawing Sheets

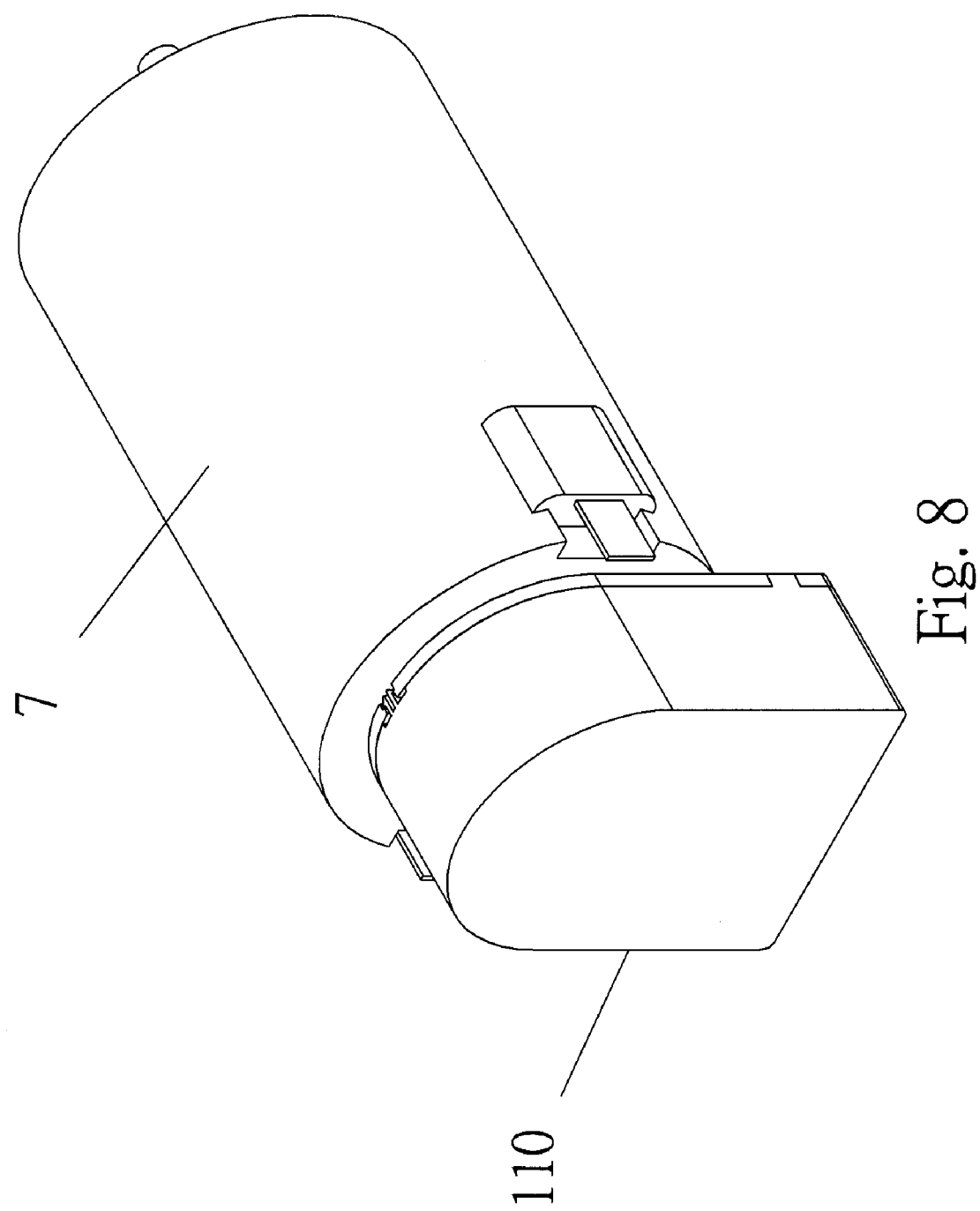

ENCODER MODULE WITH A SLIDING ASSEMBLY

FIELD OF THE INVENTION

The present invention relates to encoder modules, in particular to an encoder module with a sliding assembly, wherein the disk of the encoder module can be updated easily.

BACKGROUND OF THE INVENTION

Referring to FIG. 1, the structural schematic view about a prior art encoder is illustrated. The encoder 100 has a cover 1, a disk 2, a reading head 3 and a bottom plate 4 which are combined as an encoder module 100. In assembly, the reading head 3 serves to read signals from the disk 2. Then a screw 6 serves to combine the reading head 3 with the bottom plate 4. Then the cover 1 covers the structure. Finally, a disk 2 is connected thereto so as to form as an encoder module. Finally, the cover 1 covers the structure. In this prior art, the screw is deadly locked so that it is difficult to update the reading head 3 and disk 2. Furthermore, the disk 2 is easy to be damaged.

Thus, the prior art encoder module is inconvenient and is necessary to be updated.

The various objects and advantages of the present invention will be more readily understood from the following detailed description when read in conjunction with the appended drawing.

BRIEF DESCRIPTION OF THE DRAWINGS

Accordingly, the object of the present invention is to provide an encoder module with a sliding assembly, the disk can be updated easily.

Another object of the present invention is to provide an encoder module with a sliding assembly, wherein the disk can be updated easily, the disk will not be damaged. Furthermore, the encoder module with a sliding assembly of the present invention has a longer lifetime.

To achieve above object, the present invention provides an encoder module with a sliding assembly, comprising: a cover, a disk, a reading head, a bottom plate, and a sliding unit; wherein in assembly, the disk is installed at an upper front side of the bottom plate; the reading head is installed upon a front side of the sliding unit; the sliding unit is pushed into a lower hole of the bottom plate so that a front end of the sliding unit exposes from the lower hole of the bottom plate; in that the reading head serves to read signals from the disk; finally the cover covers upon an outer sides of the bottom plate, the sliding unit and the reading head so as to form as an encoder module with a sliding assembly.

The various objects and advantages of the present invention will be more readily understood from the following detailed description when read in conjunction with the appended drawing.

BRIEF DESCRIPTION OF THE DRAWINGS

Figure 1:
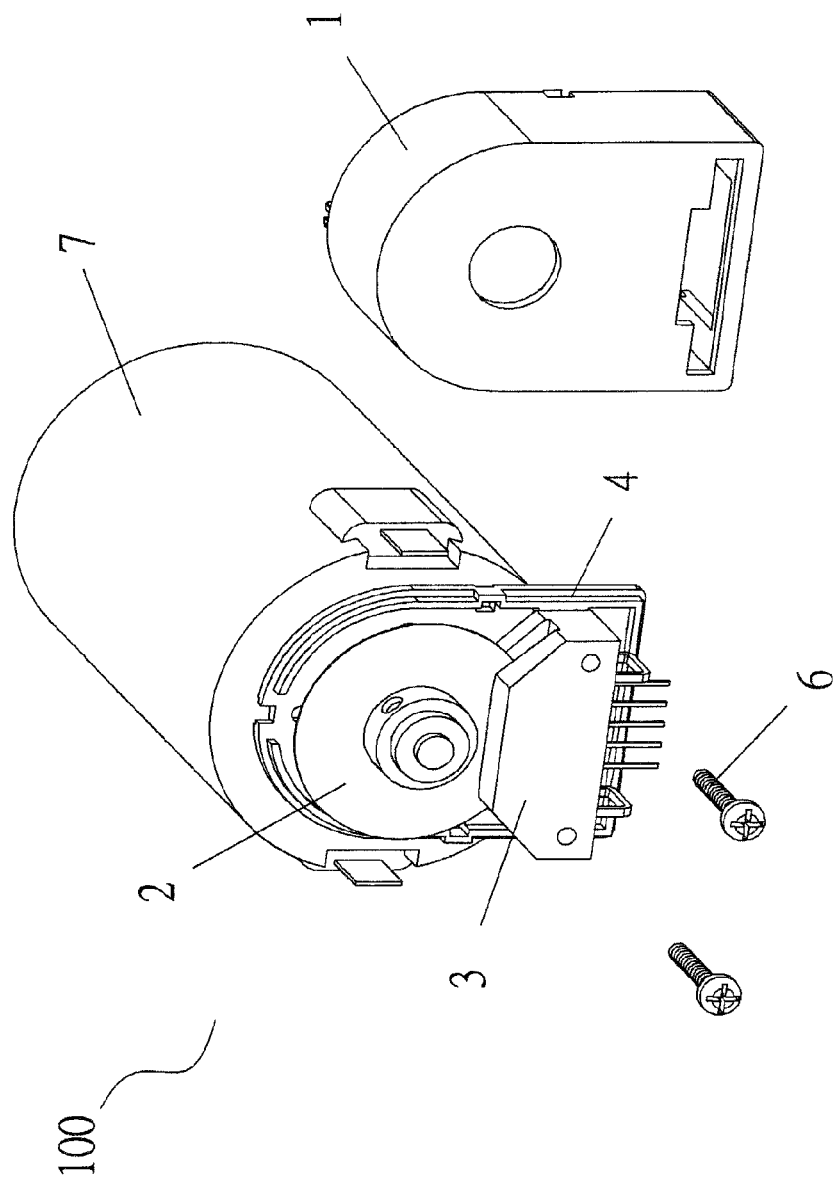

FIG. 1 is an assembled schematic view of a prior art encoder module.

Figure 2:
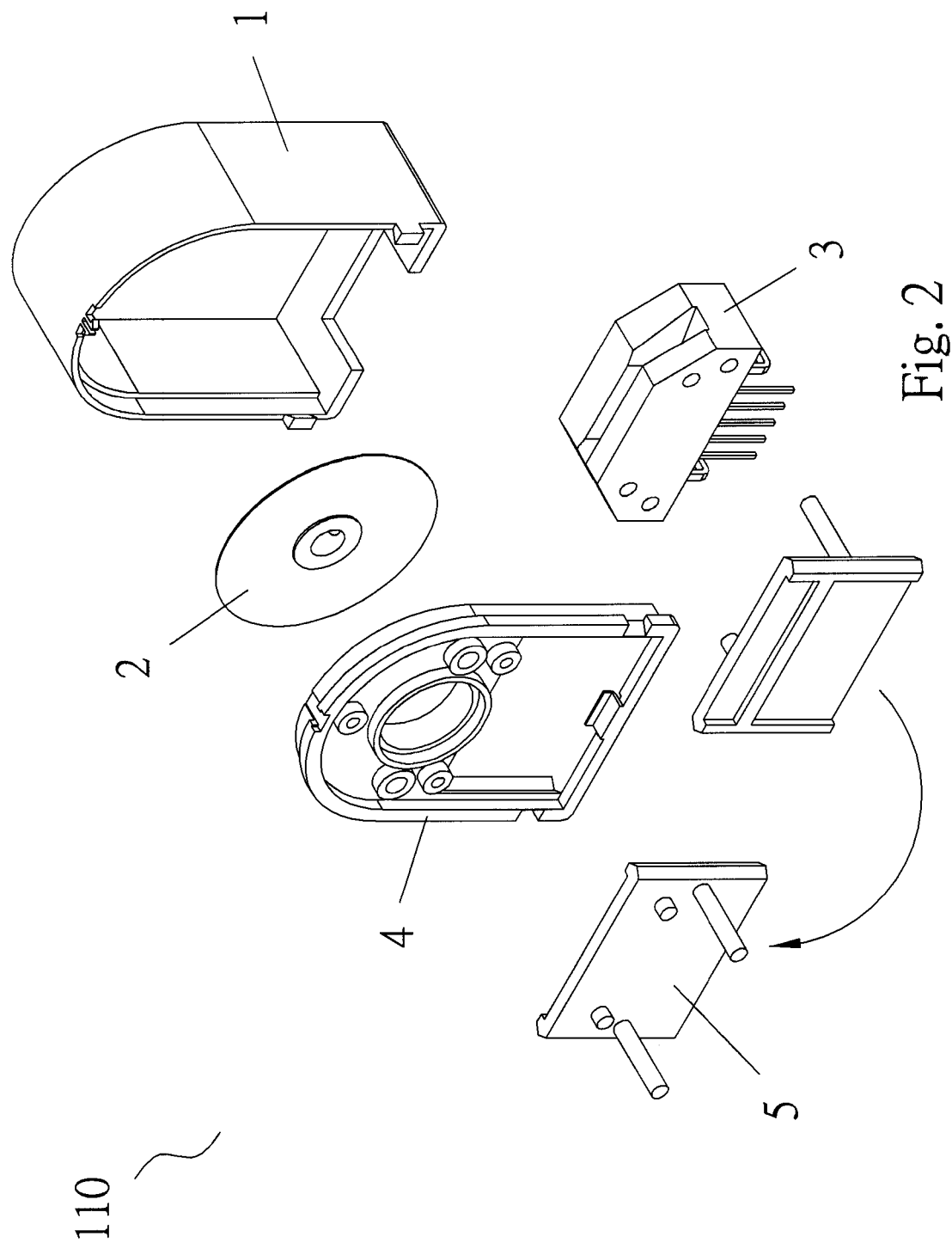

FIG. 2 is an assembled schematic view of the encoder module with a sliding assembly according to the present invention.

Figure 3:
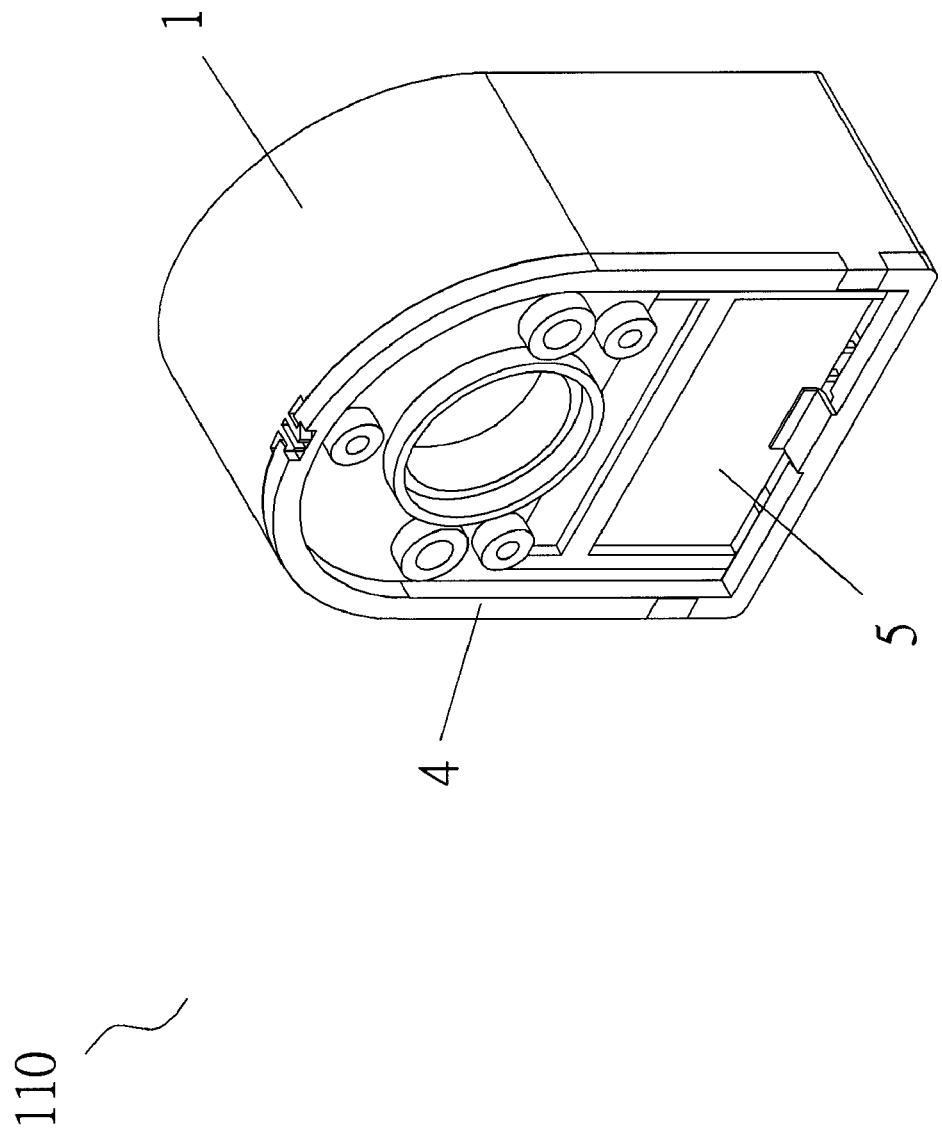

FIG. 3 is a perspective view showing the encoder module with a sliding assembly of the present invention.

Figure 4:
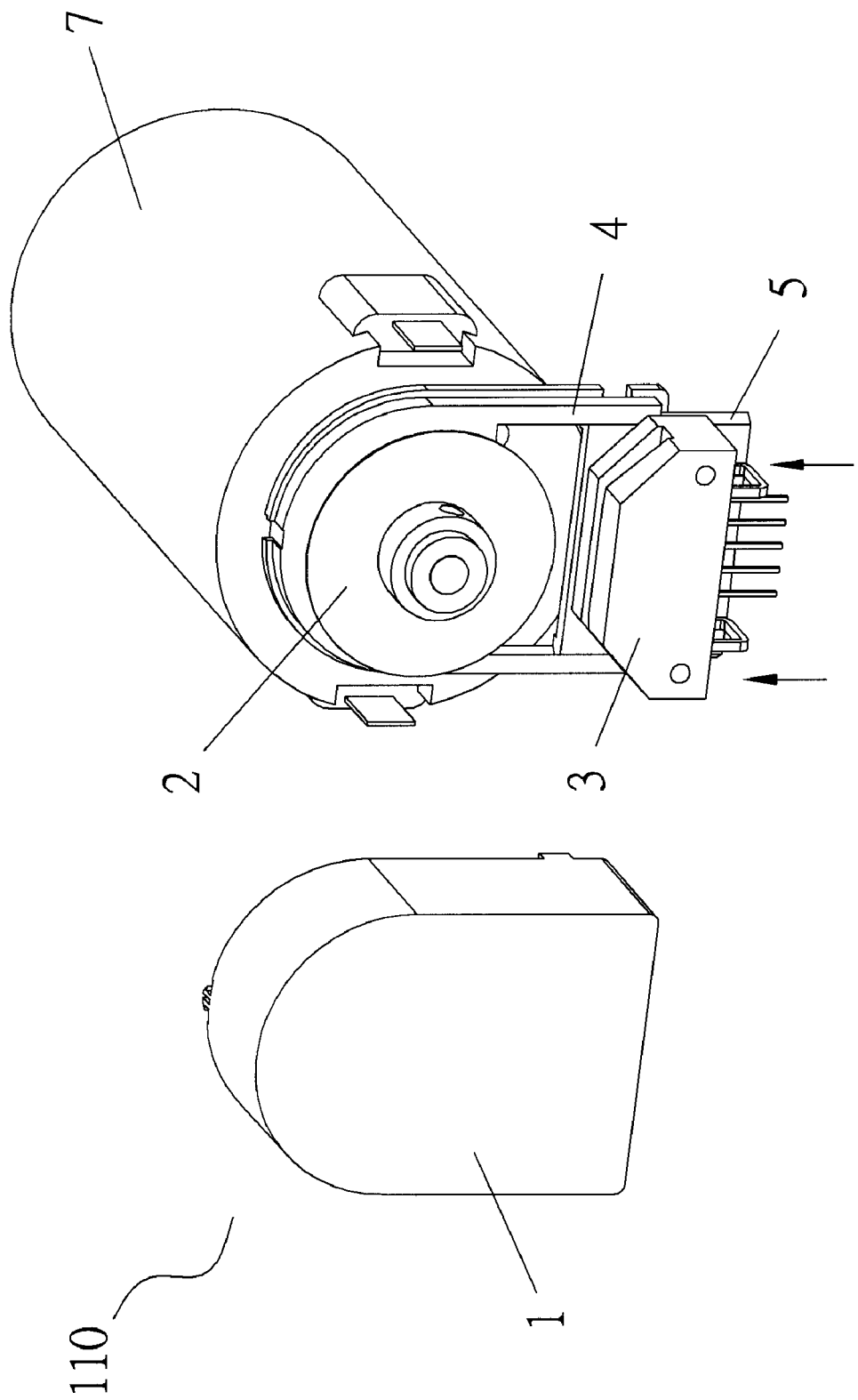

FIG. 4 is a schematic view showing the encoder module with a sliding assembly of the present invention before operation.

Figure 5:
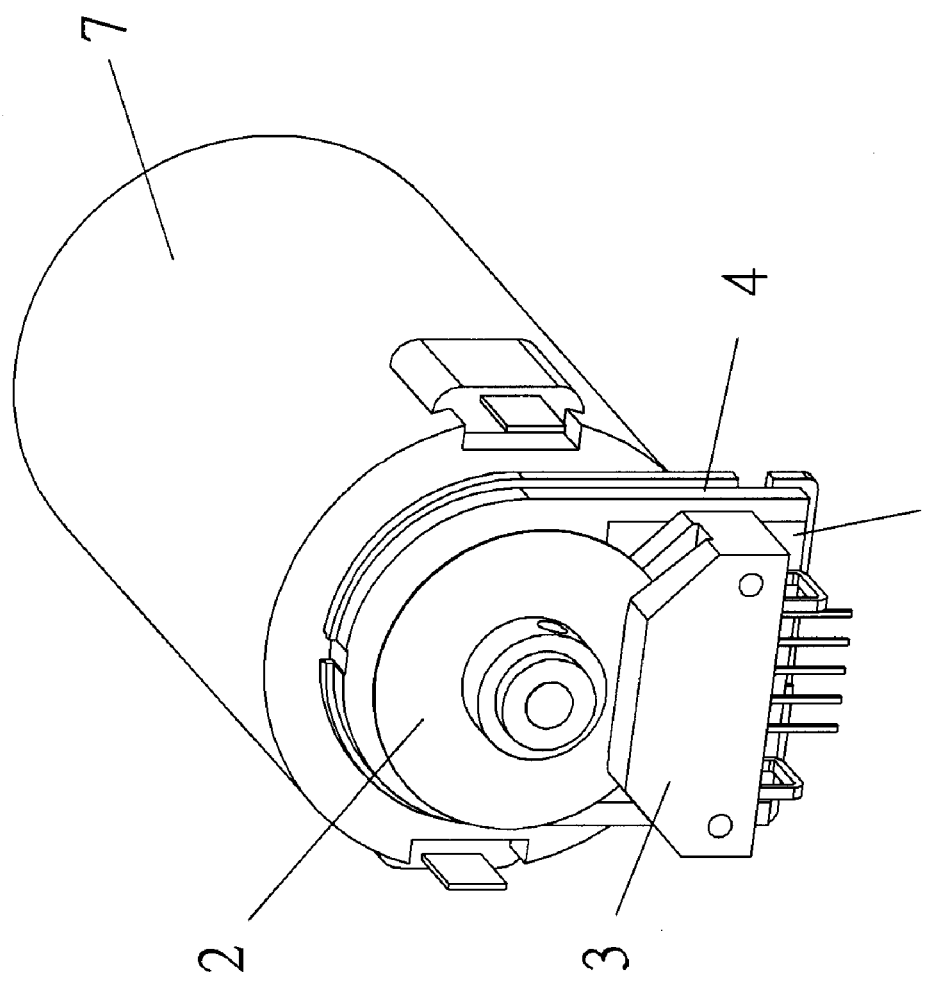
Figure 5:
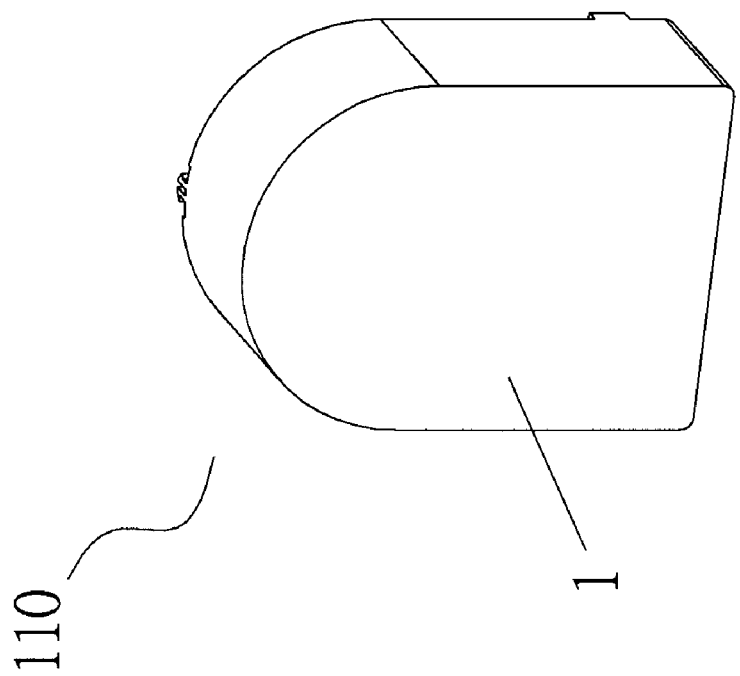

FIG. 5 is a schematic view showing the encoder module with a sliding assembly of the present invention after operation.

Figure 6:
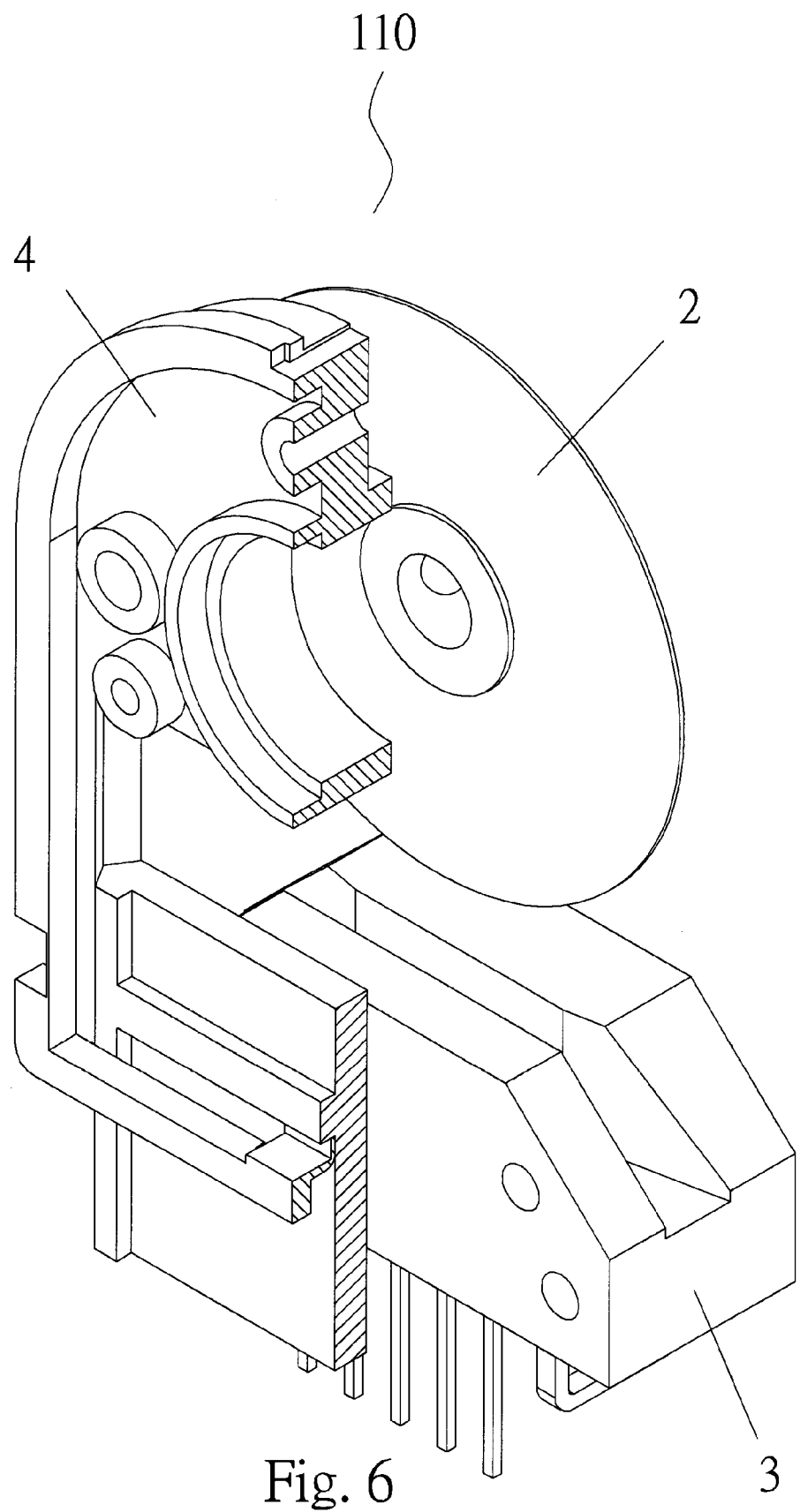

FIG. 6 is a schematic cross sectional view of the encoder module with a sliding assembly according to the present invention before operation.

Figure 7:
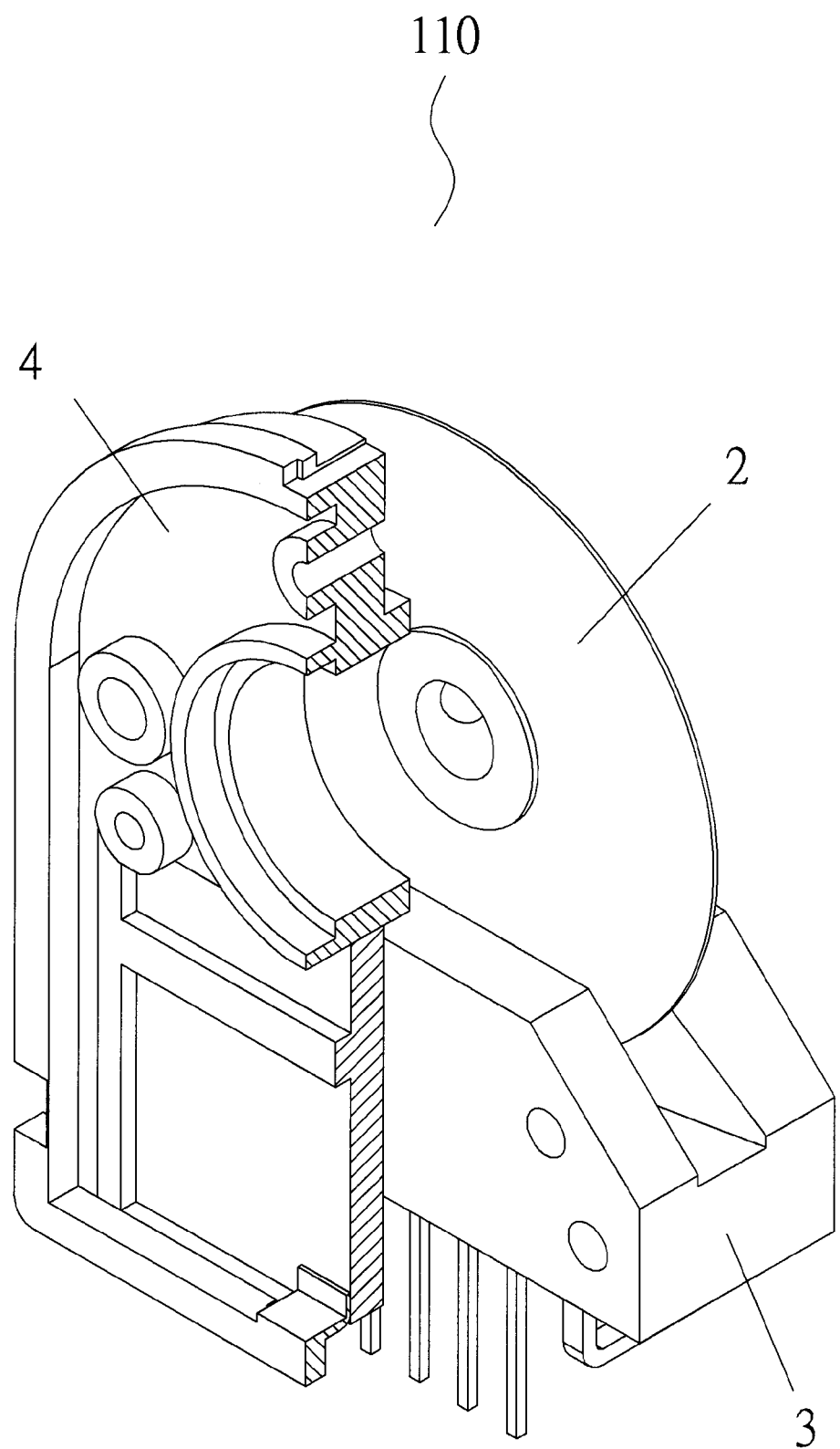

FIG. 7 is a schematic cross sectional view of the encoder module with a sliding assembly according to the present invention after operation.

FIG. 8 is a schematic view showing the operation of the encoder module with a sliding assembly according to the present invention.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Referring to FIG. 1, the structural schematic view about a prior art encoder is illustrated. The encoder 100 has a cover 1, a disk 2, a reading head 3 and a bottom plate 4 which are combined as an encoder module 100. In assembly, the reading head 3 serves to read signals from the disk 2. Then a screw 6 serves to combine the reading head 3 with the bottom plate 4. Then the cover 1 covers the structure. Finally, a disk 2 is connected thereto so as to form as an encoder module.

Referring to FIG. 2, the sliding assembly of an encoder module of the present invention is illustrated. The sliding assembly includes a cover 1, a disk 2, a reading head 3, a bottom plate 4, and a sliding unit 5 which are assembled as a sliding assembly of an encoder module 100.

In assembly, the disk 2 is installed at an upper front side of the bottom plate 4. The reading head 3 is installed upon a front side of the sliding unit 5. The sliding unit 5 is pushed into a lower hole of the bottom plate 4 so that a front end of the sliding unit 5 exposes from the lower hole of the bottom plate 4. The reading head 3 serves to read signals from the disk 2. Finally the cover 1 covers upon an outer side of the bottom plate 4, the sliding unit 5 and the reading head 3 so as to form as an encoder module with a sliding assembly.

Referring to FIG. 3, the perspective view of the encoder module with a sliding assembly of the present invention. The sliding assembly includes a cover 1, a bottom plate 4 and a sliding unit 5 which can be combined as a sliding assembly.

With reference to FIG. 4, a schematic view showing the state before the operation of the encoder module with a sliding assembly of the present invention. In the encoder module with a sliding assembly 110, the reading head 3 is installed upon the sliding unit 5, while it does not read the signals from the disk 2 and the sliding unit 5 is placed within the bottom plate 4. The cover 1 covers the structure which is connected to a driving motor 7.

Referring to FIG. 5, a schematic view showing the state after the operation of the encoder module with a sliding assembly of the present invention. In the encoder module with a sliding assembly 110, the reading head 3 is moved to be upon the disk 2 so as to read the signals of the disk 2, while it does not read the signals from the disk 2 and the sliding unit 5 is placed within the bottom plate 4. The cover 1 covers the structure which is connected to a driving motor 7.

With reference to FIG. 6, a schematic cross sectional view showing the state before the operation of the encoder module with a sliding assembly of the present invention. In the encoder module with a sliding assembly 110, the reading head 3 does not read the signals from the disk 2. The reading head 3 is in the bottom plate 4.

With reference to FIG. 7, a schematic cross sectional view showing the state after the operation of the encoder module with a sliding assembly of the present invention. In the encoder module with a sliding assembly 110, the reading head 3 had read the signals from the disk 2. The reading head 3 is in the bottom plate 4.

Referring to FIG. 8, schematic view showing the operation of the encoder module with a sliding assembly of the present invention. From the drawing, it knows that the encoder module with a sliding assembly 110 is in contact with the driving motor 7 for checking the angle, position, speed, distance, calculation and others by using the encoder.

Advantages of the present invention will be described herein. The encoder module with a sliding assembly causes that the disk can be updated easily, the disk will not be damaged. Furthermore, the encoder module with a sliding assembly of the present invention has a longer lifetime.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An encoder module comprising:
   a sliding assembly comprising:
      a bottom plate having a lower hole having two opposite vertical sides;
      a disk installed at an upper front side of said bottom plate;
      a sliding unit fitted into said lower hole of said bottom plate thereby exposing a front end of said sliding unit from said lower hole of said bottom plate, said sliding unit having two opposite vertical sides slidably engaged with said vertical sides of said bottom plate;
      a reading head for reading signals from said disk, said reading head being installed upon a front side of said sliding unit; and
   a cover covering upon an outer side of said bottom plate, said sliding unit and said reading head.

* * * * *